United States Patent Office 3,369,904
Patented Feb. 20, 1968

3,369,904
PHOTOGRAPHIC SENSITIZING DYES
Jan W. H. Faber, Rochester, N.Y., assignor to Eastman Kodak Company, Rochester, N.Y., a corporation of New Jersey
No Drawing. Filed Dec. 30, 1964, Ser. No. 422,424
6 Claims. (Cl. 96—102)

ABSTRACT OF THE DISCLOSURE

Dye compounds useful as sensitizing dyes for photographic silver halide emulsions are prepared by reacting an aromatic polyamine with a 2,4-dinitrophenylpyridinium salt.

This invention relates to novel dyes, which are useful in photography, and more particularly in photographic elements as optical sensitizers.

It is, therefore, the principal object of this invention to provide novel chemical compounds which have utility as sensitizing dyes. A further object is to provide photographic elements sensitized with the novel dyes of the present invention. Still another object is to provide dyes which are readily and economically prepared. Still another object is to provide polymeric dyes that are non-diffusing in photographic emulsions. Other objects will become apparent hereinafter.

The novel compounds of the present invention are advantageously represented by the following formula:

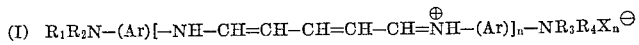

(I) $R_1R_2N-(Ar)[-NH-CH=CH-CH=CH-CH=\overset{\oplus}{N}H-(Ar)]_n-NR_3R_4X_a^\ominus$ wherein Ar is a divalent aormatic radical, such as a phenylene, a benzophenylene, a naphthophenylene, a dibenzophenylene, a biphenylene, a terphenylene, a tetraphenylene, etc., $R_1$, $R_2$, $R_3$ and $R_4$ are hydrogen atoms or aliphatic or aromatic hydrocarbon radicals, hereinafter referred to as hydrocarbyl radicals, having from 1 to 8 carbon atoms which may optionally be substituted by neutral groups such as hydroxyl, carbalkoxyl, carbamido, alkylthio, arylthio, cyano, etc. and X is an acid radical such as a halide radical, an alkyl sulfate, an alkyl sulfonate radical, an aryl sulfonate radical, the perchlorate radical, etc., and $n$ represents an integer of from 1 to 10. The aromatic radical may be unsubstituted, or substituted by one or more radicals and, if containing more than one ring, partially hydrogenated such as in the case of dihydroanthracene or contain oxygen instead of hydrogen on one ring such as in the case of anthraquinone. The radicals, which may comprise substituents on the aromatic ring, include radicals having the formulas: $-R_5$, $-OR_6$, $-NR_7R_8$, $-SR_9$, and $-COR_{10}$ where $R_5$, $R_6$, $R_7$, $R_8$, $R_9$ and $R_{10}$ are hydrogen or hydrocarbyl radicals of one to eight carbon atoms. Typical hydrocarbyl radicals, which can be present in the compounds of the present invention are methyl, ethyl, isopropyl, cyclohexyl, phenyl, benzyl, tolyl, and xylyl radicals which may optionally be substituted with neutral groups such as those indicated above. Typical radicals having the formula $-OR_6$, hereinafter referred to as hydrocarbyloxy radicals, which may be substituents on the aromatic radical, are methoxy, ethoxy, propoxy, phenoxy, benzoxy, and tolyloxy radicals.

Typical amino substituents, on the aromatic radical, are amino, methylamino, diethylamino, anilino, and diphenylamino radicals. Typical substituents having the formula $-SR_9$ hereinafter referred to as hydrocarbylthio radicals are methylthio, ethylthio, hexylthio, cyclohexylthio, and benzylthio radicals. Typical radicals having the formula $-COR_{10}$, hereinafter referred to as hydrocarboyl radicals are acetyl, propionyl, hexanoyl, benzoyl, and toluoyl radicals. The term aromatic radicals as used herein is intended to cover both substituted and unsubstituted aromatic radicals.

The novel sensitizer compounds are prepared by reaction of an aromatic polyamine having the general formula $R_1R_2N(Ar)NH_2$, wherein $R_1$, $R_2$ and Ar have the indicated meaning, with a 2,4-dinitrophenylpyridinium salt. The reaction is carried out in an aliphatic alcohol having from 1 to 18 carbon atoms and mixtures thereof but preferably methanol, and is very rapid even at room temperature. The dye can be precipitated out of the solution by pouring into an excess of a less polar solvent such as acetone. If the ratio of the amine to the pyridinium salt is in excess of two, the dyes of Formula I are obtained in which $n$ is one. If the ratio of the amine to the pyridinium salt is reduced to below two and the amine contains two $NH_2$ groups, or if the compound of Formula I, in which $n$ is one and in which an R in the indicated amino groups is hydrogen, is reacted with additional pyridinium salt, the polymeric dyes of Formula I are formed in which $n$ is from 2 to about 10. The degree of polymerization depends on the reagent concentrations and the reaction conditions but generally is controlled so the molecular weight of the polymer does not exceed about 1000. Although acting as sensitizers, polymeric materials having higher molecular weights are too bulky for the purposes of the present invention. The end groups in the polymeric materials may differ depending on the concentration of the reagents. Generally, the polymer end groups comprise amino groups.

The preparation of the sensitizer compounds of the present invention is further illustrated by the following examples.

Example 1

Into a 500-cc. beaker was placed 29.15 g. (0.1 mole) of 2,4-dinitrophenylpyridinium chloride and 200-cc. of methanol. To this mixture was then added with stirring 22 g. (0.22 mole) of p-phenylenediamine. The reaction mixture turned black almost immediately and a precipitate was formed. After stirring for two minutes, the mixture was filtered and the filtrate poured into 500-cc. of acetone. Fine purple needles precipitate. The needles were collected by filtration and extracted in a Soxhlet extractor with acetone for 48 hours. The product was identified as 1-(p-aminoanilino) - 5-(p-aminophenylimino)-1,3-pentadiene hydrochloride and had the formula:

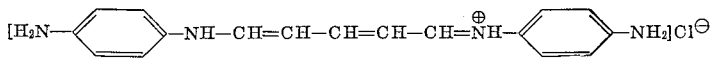

$[H_2N-\phantom{X}\rangle-NH-CH=CH-CH=CH-CH=\overset{\oplus}{N}H-\phantom{X}\rangle-NH_2]Cl^\ominus$ The compound had a maximum absorption in the visible region at 5250° angstrom.

Example 2

The procedure of Example 1 was repeated using 0.22 mole N,N-dimethyl-p-phenylenediamine as the aromatic polyamine. The product obtained was 1-(p-dimethylaminoanilino) - 5 - (p-dimethylaminophenylimino)-1,3-pentadiene hydrochloride having the formula:

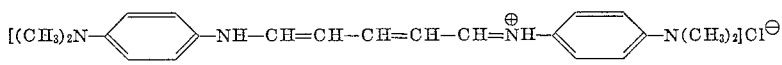

The compound had a maximum absorption in the visible region at 5500° angstrom.

*Example 3*

The procedure of Example 1 was repeated using 0.22 mole of 2,4-diaminotoluene as the aromatic polyamine. The product obtained was 1-(3-amino-4-toluidino)-5-(3-amino-4-tolylimino)-1,3-pentadiene hydrochloride having the formula:

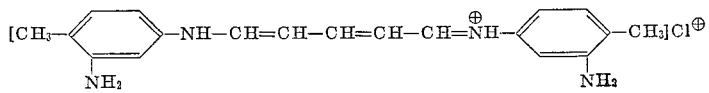

The compound had a maximum absorption in the visible region at 5000° angstrom.

*Example 4*

The procedure of Example 1 was repeated using 0.22 mole of 2,5-diaminotoluene as the aromatic polyamine. The product obtained was 1-(4-amino-3-toluidino)-5-(4-amino-3-tolylimino)-1,3-pentadiene hydrochloride having the formula:

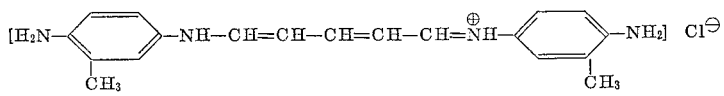

The compound had a maximum absorption in the visible region at 5250° angstrom.

*Example 5*

The procedure of Example 1 was repeated using 0.22 mole of o-dianisidine as the aromatic polyamine. The product obtained was 1-[4-(4-amino-3-methoxyphenyl)-2-methoxy-anilino] - 5 - [4-(4-amino-3-methoxyphenyl)-2 - methoxyphenylimino] - 1,3 pentadiene hydrochloride having the formula:

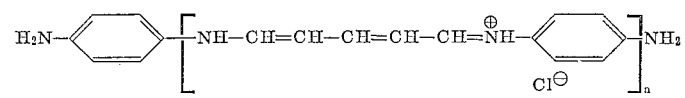

This compound had a maximum absorption at 5400° angstrom and another absorption peak at 6600° angstrom.

*Example 6*

The pentadiene hydrochloride of Example 1 was dissolved in methanol and the solution refluxed. To the refluxing solution was added slowly 0.12 mole of 2,4-dinitrophenylpyridinium chloride. Refluxing was continued for 24 hours and the reaction mixture was filtered. The filtrate was poured into excess acetone and a precipitate of poly (1,4-phenylene)-1,7-diaza-1,3,5-heptatrienyl hydrochloride was obtained. The polymer had a molecular weight of up to about 1000, and corresponds to the formula:

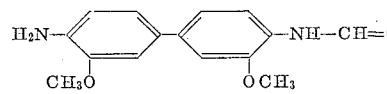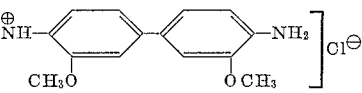

where *n* has a value of from 2 to about 10.

The polymer showed the same maximum absorption as the pentadiene hydrochloride from which it is prepared, i.e., 5250° angstrom.

The foregoing examples illustrate the ease with which the dyes of the present invention can be prepared. It will thus be readily apparent to one skilled in the art that aromatic polyamines in general can be employed to form the novel dyes of the present invention using the illustrated methods. Using the aforesaid procedures, pentadiene hydrochlorides of Formula I are prepared by reacting 2,4-dinitrophenyl pyridinium chloride with an aromatic polyamine, e.g., benzidine, diaminoanthraquinones, diaminoanthracenes, diaminonaphthalenes, 2 - dimethylamino-5-aminotoluene, 2-methoxy - 4 - aminoaniline, 4-diphenylaminoanilino, 4-phenoxy-3-aminoaniline, 2-acetyl-4-aminoaniline, 3-benzylthio-4-aminoaniline, etc.

The dyes of the present invention spectrally sensitize photographic silver halide emulsions when incorporated therein. The dyes are especially useful for extending the spectral sensitivity of the customarily employed gelatino-silver-chloride, gelatino-silver-chlorobromide, gelatino-silver bromide and gelatino-silver bromoiodide emulsions.

To prepare emulsions sensitized with one or more of the new dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Methanol has proved satisfactory as a solvent. The dyes are advantageously incorporated in the finished, washed emulsions and should be uniformly distributed throughout the emulsions.

The concentration of the dyes in the emulsions can vary widely, e.g., from 5 to 100 mg. per liter of flowable emulsion. The concentration of the dyes will vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver-halide emulsion sensitized with one or more of the new dyes, the following procedure is satisfactory.

A quantity of dye is dissolved in methyl alcohol or acetone (or a mixture of methyl alcohol and pyridine) and a volume of this solution, which may be diluted with water, containing from 5 to 100 mg. of dye, is slowly added to about 1000-cc. of gelatino-silver-halide emulsion, with stirring. Stirring is continued until the dye is thoroughly dispersed in the emulsion.

With most of the dyes, of the present invention, from 10 to 20 mg. of dye per liter of gelatino-silver bromide or bromoiodide emulsion (containing about 40 g. of silver halide) suffices to produce the maximum sensitizing effect. With the finer grain emulsions, somewhat larger concentration of dye may be needed to produce the maximum sensitizing effect.

The above statements are only illustrative, as it will be apparent that the dyes can be incorporated in photographic emulsions by any of the other methods customarily employed in the art, e.g., by bathing a plate of film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film, or paper in the usual manner.

Photographic silver halide emulsions, such as those listed above, containing the sensitizing dyes of my invention can also contain such addenda as chemical sensitizers (e.g., sulfur sensitizers, such as allyl thiocarbamide, thiourea, allylisothiocyanate, cystine, etc.), various gold compounds (such as potassium chloroaurate, auric trichloride, etc.) (see U.S. Patents 2,540,085; 2,597,856; and 2,597,915, for example), various palladium compounds (such as palladium chloride) (U.S. 2,540,086), potassium chloropalladate (U.S. 2,598,079), etc., or mixtures of such sensitizers), antifoggants (e.g., benzotriazole, nitrobenzimidazole, 5-nitroindazole, etc. (see Mees, "The Theory of the Photographic Process," Macmillan Publishers, 1942, p. 460), or mixtures thereof, hardeners (e.g., formaldehyde (U.S. 1,763,533), chrome alum (U.S. 1,763,533), glyoxal (German 538,713), dibromacrolein (Great Britain 406,750), etc.), color couplers (e.g., such as those described in U.S. Patent 2,423,730, Spence and Carroll U.S. Patent 2,640,776 issued June 2, 1953, etc.), or mixtures of such addenda. Dispersing agents for color couplers, such as substantially water-insoluble, high boiling crystalloidal materials, such as those set forth in U.S. Patents 2,322,027 and 2,304,940, can also be employed in the above-described emulsions.

In the manner described above, a number of the dyes of the present invention represented by Formula I above were separately incorporated in a melted silver bromoiodide emulsion of the type described by Trivelli and Smith, Phot. Journal, 79, 330 (1939), the dyes being added in the form of a solution in an organic solvent.

The dyes were then thoroughly dispersed in the emulsion by stirring. After a short digestion for 10 minutes at 50° C., the emulsions were coated onto ordinary cellulose acetate film supports and the coatings exposed in a spectrograph and sensitometer and then developed in the usual way. The sensitizing range and maximum absorption for several of the dyes are indicated in the following table.

| Dye of Example | Range in mμ | Max. in mμ |
| --- | --- | --- |
| I | To 670 | 585, broad. |
| II | 520 to 570 | No def. max. |
| III | To 620 | 585, broad. |
| IV | To 660 | No def. max. |
| V | To 680 | 630, broad. |

The sensitizer dyes of the present invention, particularly the polymeric dyes, show a technical advance because they do not migrate in the photographic element in which they are incorporated.

It will be understood that modifications and variations may be made within the scope of the invention as described above and as defined in the following claims.

I claim:

1. A photographic silver halide emulsion containing a dye selected from the class consisting of compounds having the formula:

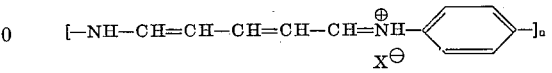

wherein $R_1$, $R_2$, $R_3$ and $R_4$ are radicals selected from the group consisting of hydrogen and hydrocarbyl radicals of one to eight carbon atoms, Ar is a divalent aromatic radical, X is an acid radical and $n$ is an integer of from 1 to 10.

2. A photographic silver halide emulsion of claim 1 containing a dye having repeating units of the formula:

$$[-NH-CH=CH-CH=CH-CH=\overset{\oplus}{N}H-\langle\phantom{xx}\rangle-]_n$$
$$X^\ominus$$

wherein X is an acid radical and $n$ is an integer of from 2 to 10.

3. A photographic silver halide emulsion containing a containing a dye having repeating units of the formula:

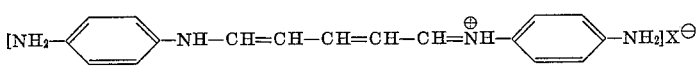

wherein X is an acid radical.

4. A photographic silver halide emulsion sensitized with a dye having the formula:

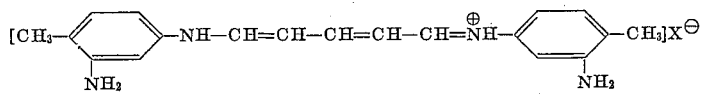

wherein X is an acid radical.

5. A photographic silver halide emulsion sensitized with a dye having the formula:

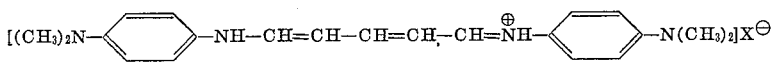

wherein X is an acid radical.

6. A photographic silver halide emulsion sensitized with a dye having the formula:

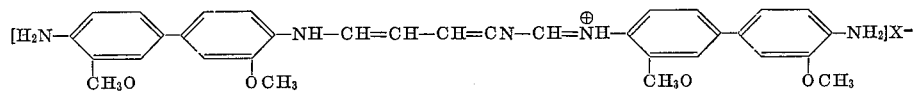

wherein X is an acid radical.

References Cited

UNITED STATES PATENTS 2,199,542  5/1940  Konig _____ 96—102
2,369,509  2/1945  White _____ 96—102

OTHER REFERENCES

Grigoreva et al.: Chemical Abstracts, vol. 50, pp. 13917–8 (1956).

NORMAN G. TORCHIN, *Primary Examiner.*

J. TRAVIS BROWN, *Assistant Examiner.*

UNITED STATES PATENT OFFICE
CERTIFICATE OF CORRECTION

Patent No. 3,369,904                           February 20, 1968

Jan W. H. Faber

It is hereby certified that error appears in the above numbered patent requiring correction and that the said Letters Patent should read as corrected below.

Columns 3 and 4, lines 17 to 19, the portion of the formula reading $CH_3]Cl\ \oplus$          should read          $CH_3]Cl\ \ominus$ Column 6, line 25, cancel "containing a"; line 26, cancel "repeating units of". Columns 5 and 6, the portion of the formula reading $-NH-CH=CH-CH=CN-CH=\overset{\oplus}{NH}-$    should read    $-NH-CH=CH-CH=CH-CH=\overset{\oplus}{NH}-$ Signed and sealed this 23rd day of September 1969.

(SEAL)
Attest:

EDWARD M. FLETCHER, JR.                     WILLIAM E. SCHUYLER, JR.
Attesting Officer                              Commissioner of Patents